J. E. GLEASON.
GEAR CUTTING MACHINE.
APPLICATION FILED APR. 10, 1919.

1,406,001.

Patented Feb. 7, 1922.
5 SHEETS—SHEET 1.

Witnesses:
Edw H Cumpston
Nelson H. Copp

INVENTOR
James E. Gleason
BY
his ATTORNEYS

J. E. GLEASON.
GEAR CUTTING MACHINE.
APPLICATION FILED APR. 10, 1919.

1,406,001.

Patented Feb. 7, 1922.
5 SHEETS—SHEET 3.

Witnesses:
Edw. H. Cumpston
Nelson H. Copp

INVENTOR
James E. Gleason
BY
his ATTORNEYS

J. E. GLEASON.
GEAR CUTTING MACHINE.
APPLICATION FILED APR. 10, 1919.
1,406,001.
Patented Feb. 7, 1922.
5 SHEETS—SHEET 4.
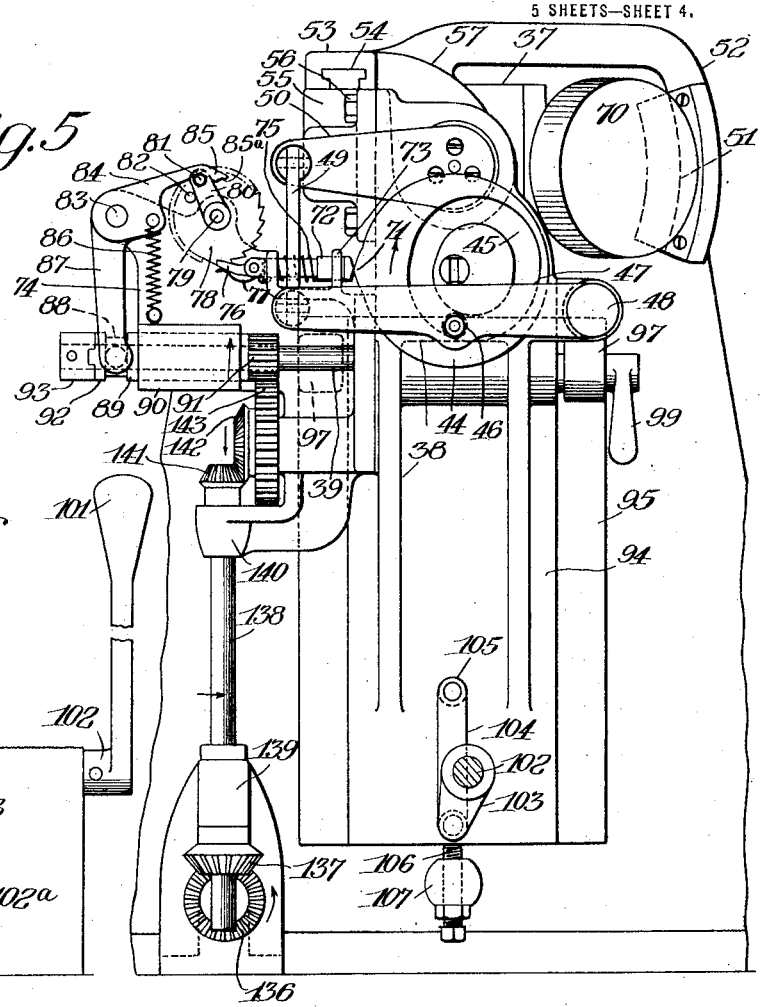
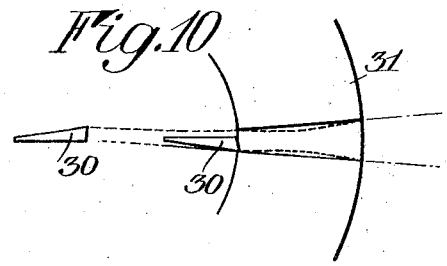
Witnesses:
Edw H Cumpston
Nelson H. Copp
INVENTOR
James E. Gleason
BY
his ATTORNEYS

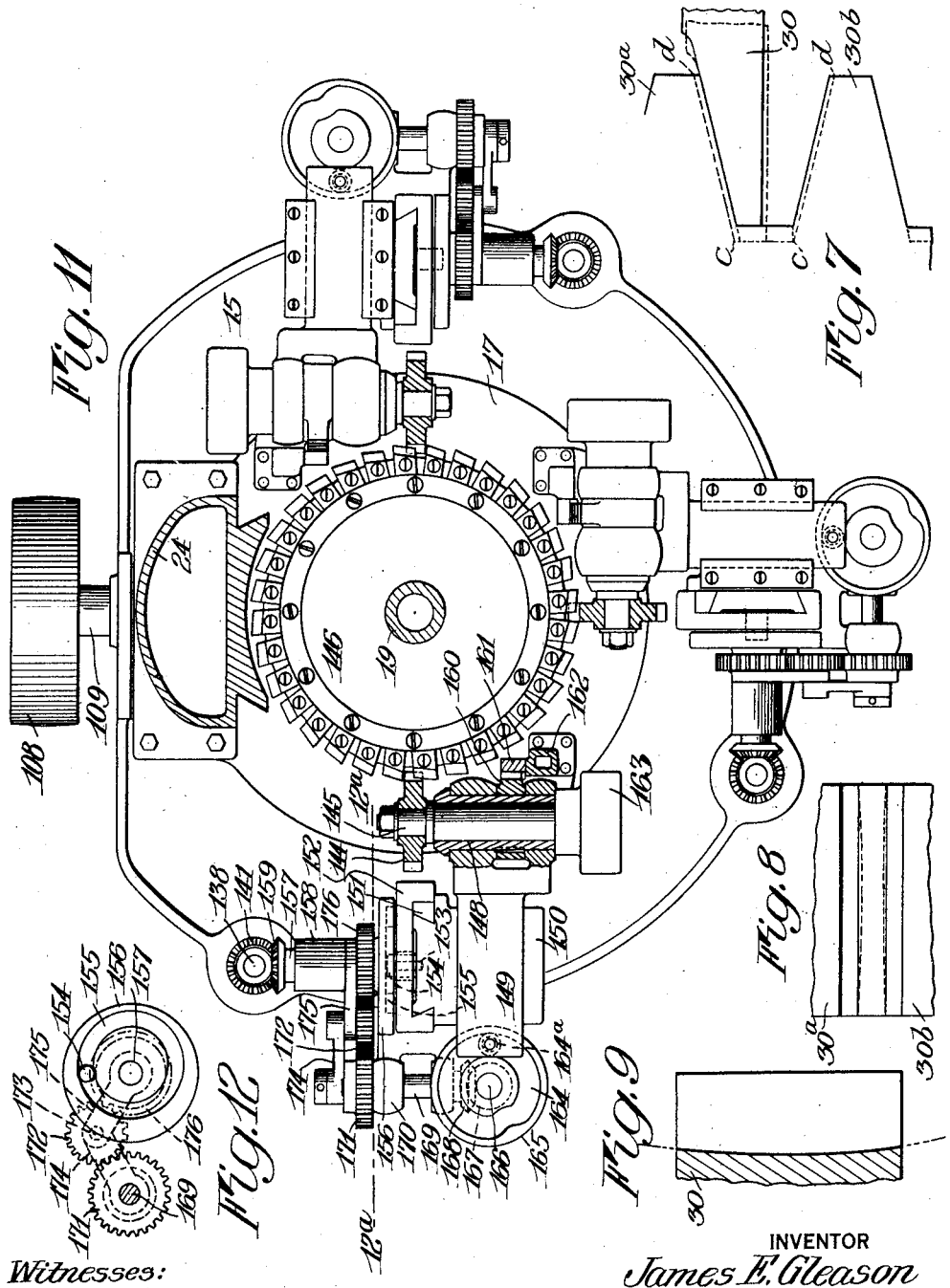

UNITED STATES PATENT OFFICE.

JAMES E. GLEASON, OF ROCHESTER, NEW YORK, ASSIGNOR TO GLEASON WORKS, OF ROCHESTER, NEW YORK, A CORPORATION OF NEW YORK.

GEAR-CUTTING MACHINE.

1,406,001.  Specification of Letters Patent. Patented Feb. 7, 1922.

Application filed April 10, 1919. Serial No. 288,947.

*To all whom it may concern:*

Be it known that I, JAMES E. GLEASON, a citizen of the United States, of Rochester, in the county of Monroe and State of New York, have invented certain new and useful Improvements in Gear-Cutting Machines; and I do hereby declare the following to be a full, clear, and exact description of the same, reference being had to the accompanying drawings, forming a part of this specification, and to the reference-numerals marked thereon.

This invention relates to the art of and machines for cutting gears and more particularly to the cutting of gears by what is known as the "generating" principle, in which use is made of a relative rolling action of the gear blank and tools, as if in rolling contact with each other upon their respective pitch surfaces, to generate the curvature of the tooth profile. This has been accomplished by various arrangements and modes of operation of the tools and blanks, the main object of the present invention being to provide a simple and more efficient method and apparatus for generating various forms of gears, employing together with the generating movement referred to, a relative cutting movement of the tools and blank in one direction and a simultaneous relative shifting movement in a transverse direction to quickly and accurately cut both sides of a tooth space at one operation. To these and other ends the invention resides in certain improvements and combinations of parts, all as will be hereinafter more fully described, the novel features being pointed out in the claims at the end of the specification.

In the drawings:

Figure 5 is an exterior elevation of the supporting and actuating means of one of the work spindles;

Figure 6 is a fragmentary side elevation of means for elevating the parts shown in Figure 5;

Figure 1:
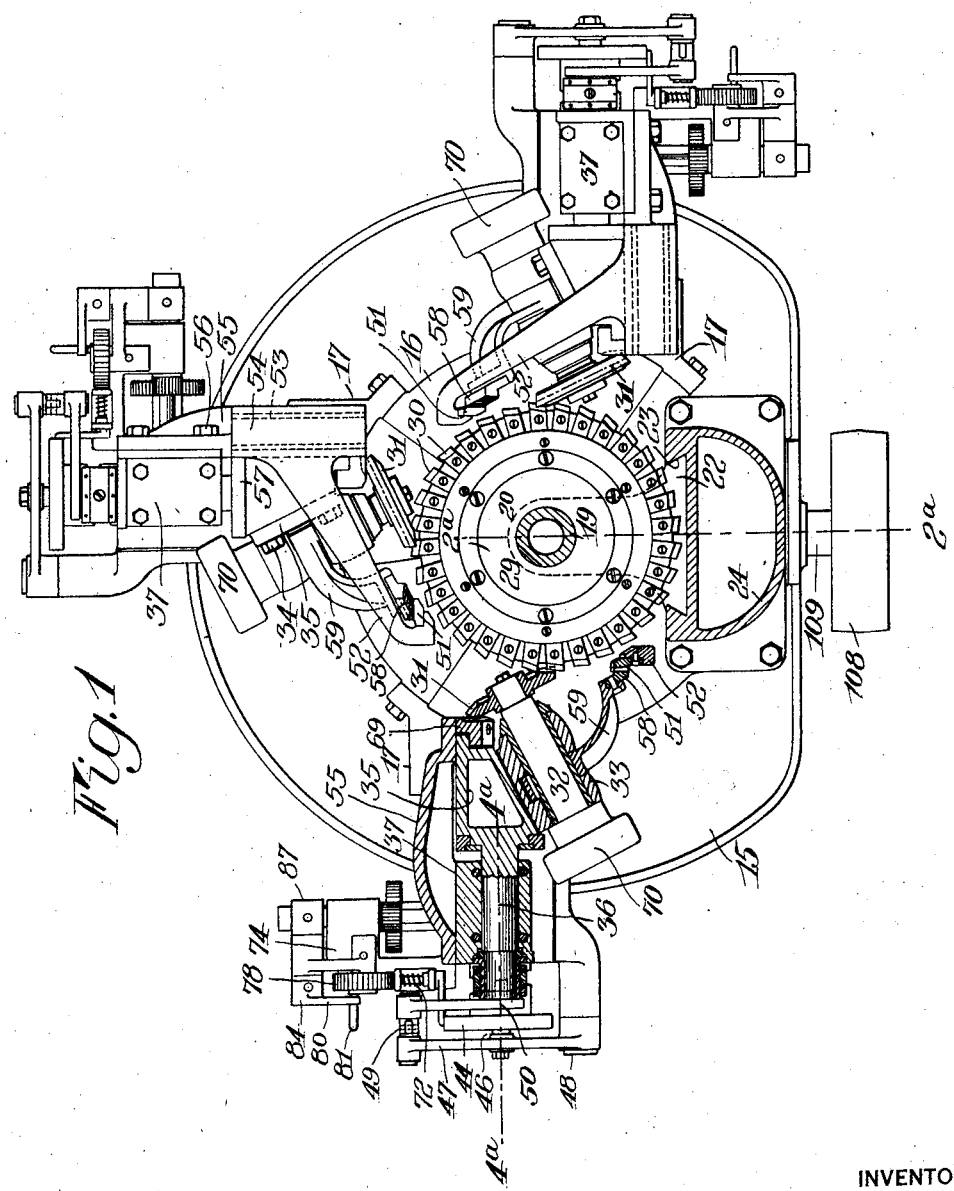
Figure 1 is a top plan view of a machine embodying the present invention, with parts shown in section.

Figures 7 to 10 inclusive are diagrammatic views illustrating the method of operation of the tools with relation to the work;

Figure 11 is a top plan view with parts in section showing a modification adapted for cutting spur gears;

Figure 12 is a fragmentary sectional elevation on the line $12^a$—$12^a$ of Figure 11.

Similar reference numerals throughout the several views indicate the same parts.

The mechanism herein disclosed as embodying the principles and accomplishing the objects of the invention is the form of construction preferred at the present time, but is selected for description merely as one illustrative embodiment as it is contemplated that various modifications may be made and the invention is by no means to be limited to the details of construction and operation of the parts herein described and shown. While the machine is intended primarily for the purpose of finishing gears, the teeth of which have already been roughly cut, it is also practicable, if desired, to accomplish both these operations by the present mechanism.

The machine comprises a base 15, from which rises a central pedestal portion 16 supporting a rotary cutter, and exterior pedestal portions 17 supporting a plurality of gear blanks disposed at intervals about the periphery of the cutter. Pedestal portion 16 is formed interiorly thereof with a bearing 18 (Figure 2) rotatably supporting, preferably, a vertically disposed spindle 19 provided adjacent its upper portion with an annular radial flange 20 carrying the cutter, above which the spindle is extended and supported in a second bearing 21 carried by a frame 22 vertically slidable in dovetailed guideways 23 of an upwardly projecting frame 24 supported on the pedestal. Pinions 25 are provided, meshing with a rack 26 on bearing frame 22, for raising the latter to obtain access to the cutter or to remove the spindle, bearing 21 having attached thereto a hood 27 and guard 28 preventing injury to or by the cutter in the operation of the machine. The bearing frame may be secured in adjusted position by any suitable means as for instance the locking bolts 26ª.

Figure 2:
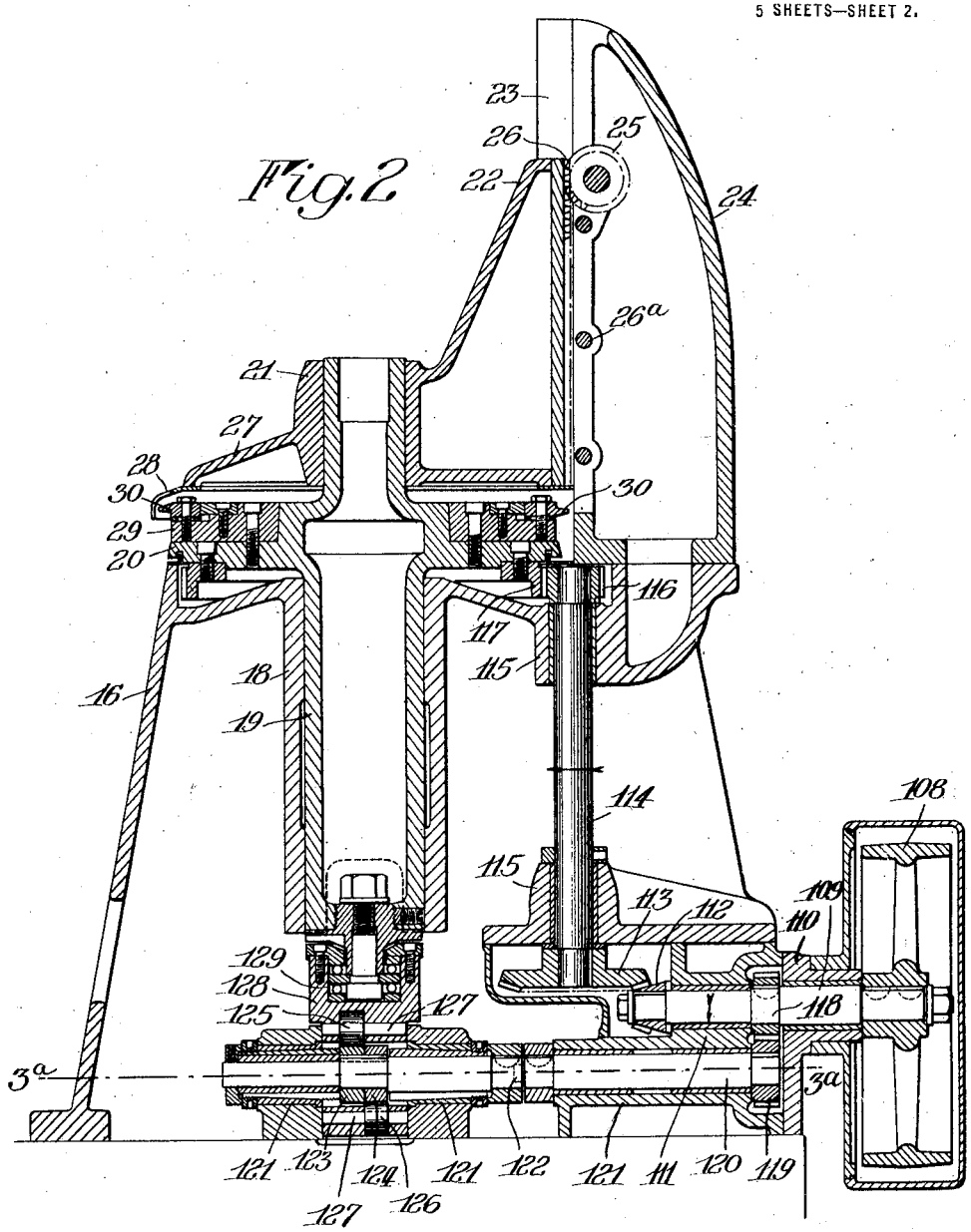
Figure 2 is a vertical section on the line $2^a$—$2^a$ of Figure 1 of the cutter with its supporting and actuating means.

The cutter comprises a tool holding disc 29 bolted or otherwise secured on flange 20 of the cutter spindle and the tools 30 are bolted or otherwise secured to the tool holder at intervals about the periphery of the latter, with their axes substantially radially thereof. The tools, preferably, are also alternately adapted for cutting the opposite sides of a tooth space, having their corresponding lateral cutting portions inclined inwardly and outwardly with relation to the plane of rotation, as illustrated in Figures 2 and 7, and are designed and moved in a manner described hereinafter so as to sweep out the space occupied by a tooth of an imaginary crown gear meshing with the blank to be cut.

The gear blanks are disposed at intervals about the periphery of the cutter and as the means for supporting and actuating them are similar in each case, a description in connection with one will suffice for all. The blank is secured by any suitable means on a spindle 32, rotatable in a bearing 33 fixed, preferably, by means of bolts 34 to an eccentrically disposed face of a carrier or frame 35 supported by the inner end of a spindle 36 rotatable in a bearing frame 37 supported on the upper surface of a bracket 38 carried by the pedestal portion 17, and as indicated in Figure 1. the axis of the blank spindle intersects the axis of spindle 36 in a point substantially at the center of the imaginary crown gear a tooth of which is represented by the tools and in the plane of the pitch surface of the latter.

The operation of the gear blank involves, generally, a rolling motion relative to the cutter for generating the tooth profile, a retracting movement, and also an indexing movement during the latter for presenting a new portion of the blank to the tools.

Figure 4:
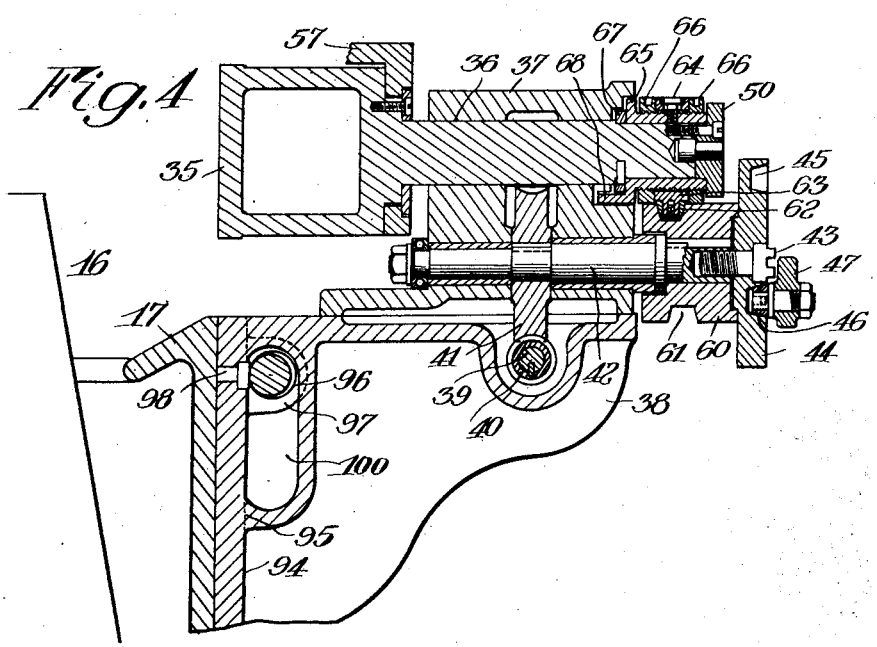
Figure 4 is a vertical section on the line $4^a$—$4^a$ of Figure 1 of the means for supporting and actuating the work spindle.

The mechanism for accomplishing the generating movement of the blank comprises a horizontal shaft 39 (Fig. 4) journaled in the bracket 38 and carrying a worm 40 meshing with a worm wheel 41 fixed on a shaft 42 journaled in the bearing frame 37 and having fixed at its outer end by means of a screw 43 a cam disc 44 provided with a cam slot 45. Operating in this slot is a roller 46 rotatably carried by a lever 47 (Fig. 5) pivotally supported at one end 48 on the bracket 38 and having pivotally attached to its other end a link 49. The upper end of link 49 is pivotally connected with an arm 50 fixed in any suitable manner to the outer end of the spindle 36. As this construction indicates, the rotation of shaft 39, through the train of mechanism described, imparts a rocking movement to spindle 36 about its axis, which oscillates the blank spindle and moves the blank bodily as if rolling with its pitch cone on the pitch surface of the imaginary crown gear, for generating the teeth profiles. To complete the generating movement, the blank is rotated about its own axis through mechanism comprising a crown gear sector 51 (Figs. 1 and 5) fixed on the end of an arm 52 extending over the work spindle and fixed to a member 53 having a T-slot engagement with a guide 54 on the upper surface of a part 55 secured by bolts 56 to a side of bearing frame 37. Member 53 has fixed thereto a second arm 57 (Figs. 4 and 5) rotatably connected with the frame 35 so that part 53 is moved inwardly and outwardly along the guideway 54 during the withdrawal of the work spindle for maintaining the crown gear sector constantly in mesh with a gear sector 58 carried by an arm 59 connected with the work spindle, and these sectors are so arranged in a manner known to the art that they rotate the blank on its own spindle so as accurately to produce a generating movement of the blank with relation to the cutter as if the blank were rolling with its pitch cone in contact with the pitch surface of the crown gear of which the cutting tools represent one tooth, as described above.

The sector 58 is detachably fixed on its arm 59 so that when cutting gears of different dimensions suitable corresponding sectors may be fixed on the arm, and while the mating sector 51 has been described as part of a crown gear in the present instance, it is to be understood that a sector of a bevel gear may likewise be employed for this purpose with suitable alteration of the shape of the tools of the cutter.

The retracting of the gear blank after the cutting of a tooth space, for indexing the blank, is accomplished by mechanism comprising a cam cylinder 60 fixed on the outer end of spindle 42 and formed with a cam slot 61 in which engages a roller 62 on a ring 63 secured by means of a screw 64, operating in a slot in the ring, to a collar 65, the latter being threaded and carrying a threaded bearing ring 66 on either side of ring 63 to provide for adjustment of the latter axially of the collar 65. The collar is rotatable on spindle 36 being held between arm 50 and a shoulder 67 on the spindle and having a lug 68 fitting into a corresponding slot in frame 37 to prevent rotation of the collar during the rocking movement of the spindle.

Cam slot 61 is so formed that during the rotation of spindle 42 at the completion of each rocking movement of spindle 36, the latter is retracted by the cam slot, thereby retracting the gear so that the latter may be indexed after which the gear is returned to position for its tooth generating movement. As an additional guide and support for the work spindle, the frame 35 to which it is secured has at its inner end a projecting portion in sliding engagement with a shoulder 69 (Figure 1) which permits the rocking movement of spindle 36 and also its retraction, at the same time steadying and supporting the structure in proximity to the work.

The indexing of the blank is accomplished by any suitable mechanism, such for instance as that disclosed in the co-pending application of Edward W. Bullock and George H. Bryan, Serial No. 173,313, and as this mechanism forms no part of the present invention, it has been indicated generally in the drawings, and further description herein is unnecessary except to say that when the blank is withdrawn after cutting a tooth, the mechanism operates automatically to rotate the blank through the pitch distance to bring the proper space for cutting the next tooth in position opposite the tools.

A means is provided for automatically disconnecting the actuating mechanism after a complete revolution of the blank and the cutting of its teeth, while the blank is withdrawn, so that it may be conveniently replaced by another. This mechanism comprises a cam surface formed on the periphery of the cam disc 44 (Figure 5) having a projecting portion 71 cooperating with a plunger 72 supported for axial movement in bearing lugs 73 on a frame 74 secured to bracket 38, a spring 75 serving to maintain the plunger in engagement with the cam. The plunger carries at its opposite end a pawl 76 pressed by a spring 77 into engagement with the teeth of a suitable ratchet wheel 78 having a spindle 79 journaled in frame 74. Pawl 76 is advanced at each revolution of cam disc 44, thereby rotating the ratchet wheel step by step during the cutting of the gear. Rotatable on the spindle 79 is an arm 80 carrying an elongated pin 81 and wheel 78 carries a pin 82 which engages and rotates the arm with the wheel.

Fixed on a shaft 83 is an arm 84 having a portion 85 projecting into the path of pin 81 and moved to such position by a spring 86. Fixed at the other end of shaft 83 is an arm 87 engaging in an annular recess 88 in the outer end of a sleeve 89 rotatably carried on an extended end of worm shaft 39, the sleeve being also supported and guided in a bearing 90 on frame 74. Fixed at the inner end of sleeve 89 is a gear 91 meshing with actuating mechanism described hereafter, the sleeve having at its outer end a clutch part 92 adapted to be engaged with a complementary part 93 fixed on the worm shaft, the action of spring 86 tending to maintain these clutch parts in engagement with each each other for driving the worm shaft, as well as to maintain the portion 85 of arm 84 in the path of rotation of pin 81, so that as the latter is rotated in a clockwise direction, the pin will raise the arm thereby disengaging the clutch and the actuating mechanism for the work spindle, the portion 85 of the arm having a recess or dwell 85$^a$ in which the pin 81 is adapted to remain with the clutch disengaged, while the gear blank is being changed, after which pin 81 is carried past the arm by hand which allows the clutch to be thrown in and the blank to be again operated.

A means is provided for raising the blank spindle above the plane of the cutter for convenience in changing the gears, comprising a plate 94 supporting bracket 38 and arranged for vertical sliding movement in dovetailed guideways 95 on the pedestal portion 17, a means being also provided for securing plate 94 to the pedestal while in operating position comprising an eccentric shaft 96 rotatable in bearing lugs 97 on the pedestal, the eccentric portion of the shaft being brought into engagement with a stud 98 slidable in plate 94 so that its inner end is forced into clamping engagement with the surface of pedestal 17 by rotation of the shaft by means of the handle 99. An opening 100 is formed in bracket 38 to accommodate movement relative thereto of shaft 96.

For raising the blank spindle and its supporting parts there is provided a lever 101 fixed on a shaft 102 rotatable in a bearing 102$^a$ (Figure 6) and having at its other end a crank 103 pivotally connected with a link 104 pivotally connected in turn with a stud 105 fixed in plate 94, a stop screw 106 carried by a lug 107 on the pedestal serving to limit the downward movement of the plate to its proper working position. Plate 94 having been unlocked by means of handle 99, the lever 101 may be conveniently operated to raise the plate and its supported parts, including the gear blank, so that the latter is well above the plane of the cutter when a new blank is to be substituted, after which the parts may be lowered to working position in engagement with stop 106 and clamped in position.

The actuating means for the various parts of the machine comprises a pulley 108 fixed on a shaft 109 supported in bearings 110—111 on the pedestal and having fixed at its inner end a gear 112 meshing with a gear 113 fixed on a vertical shaft 114 rotatably supported in bearings 115 on the pedestal and carrying at its upper end a gear 116 meshing with a spur gear 117 secured to the under side of the flange 20 of the cutter spindle. Thus, a continuous rotation is imparted to the cutter by rotation of the driving pulley.

Fixed on shaft 109 is also a gear 118 meshing with a gear 119 fixed on a shaft 120 supported in bearings 121 on the pedestal, the shaft being in two sections connected by any suitable means as for example the one tooth clutch 122 shown in the drawings, this sectional construction being for convenience in assembling and disassembling the machine. Fixed on shaft 120 are two cams 123 and 124 with which engage, respectively, rollers 125 and 126 journaled on spindles 127 in yoke member 128 which embraces shaft 120, the parts being so arranged that roll 125 engages cam 123 from above while roll 126 engages its cam 124 from below, for positively raising and lowering yoke 128 during the rotation of the shaft. The lower end of spindle 19 is connected with yoke 128 by any suitable means as, for example, the roller thrust bearing 129 shown in the drawings, it being apparent from the construction described that rotation of pulley 108 through the connecting mechanism will impart a reciprocating movement to spindle 19 parallel with its axis, simultaneously with its rotation and transversely of the plane of the latter, above and below a normal central position, the particular conformation of cams 123 and 124, and the nature of this reciprocating or shifting movement being made apparent in connection with the explanation of the operation of the machine hereinafter.

Figure 3:
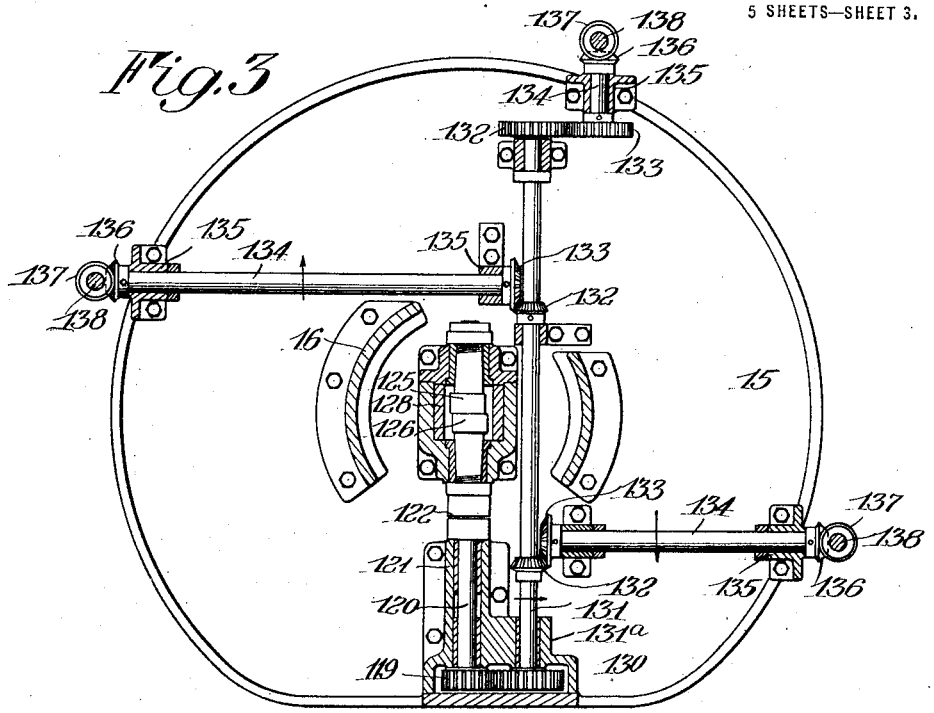
Figure 3 is a horizontal section on the line $3^a$—$3^a$ of Figure 2 showing part of the actuating mechanism.

The actuating mechanism for the blank spindles comprises a gear 130 (Figure 3) meshing with the gear 119 and fixed on a shaft 131 supported in suitable bearings 131ª on the pedestal, this shaft having fixed thereon a plurality of gears 132 each meshing with a gear 133 on a shaft 134 supported in bearings 135 on the pedestal and having fixed to the opposite end thereof a gear 136 meshing with a gear 137 on a vertically extending shaft 138. Gear 137 is rotatably supported in a bearing 139 on the pedestal and is splined on the shaft 138, the upper end of the latter being supported in a bearing 140 fixed on bracket 38, so that as the bracket is raised and lowered in the manner described above, shaft 138 is allowed to slide through the gear 137 without disconnecting the actuating mechanism. Shaft 138 has fixed on its upper end a gear 141 meshing with a gear 142 to which is secured a gear 143 meshing with and driving gear 91 clutched to the worm shaft 39 in the manner already described.

The operation of the machine and the process accomplished thereby will be understood from a brief explanation in connection with the above description of the construction. The rotation of the cutter by the various gears and shafts connecting it with the driving pulley causes the tools to sweep through a space representing a tooth of an imaginary crown gear adapted to serve as a former gear for generating the teeth of gears adapted to mesh with each other. The gear sector 58 rolling on the crown gear sector 51 during the rocking movement of spindle 36 causes the blank to rotate on its axis while the latter is swinging about the axis of the spindle 36, thus producing a relative rolling movement of the blank and cutter corresponding to the rolling of the pitch cone of the blank on the pitch surface of the imaginary crown gear represented by the rotating cutter thereby cutting a tooth space in the blank by generating the opposing faces of adjacent teeth. The blank is rolled downwardly and then upwardly, when it is withdrawn clear of the tools by means of the cam 60 and is then indexed or rotated through the pitch distance to position for cutting the next tooth. The blank is then advanced by the same means and the generating action is repeated, these various movements being brought about automatically by the mechanism described as connecting the blank spindle with the driving pulley 108. When the cutting of the blank is completed, the clutch parts 92—93 are automatically thrown out of engagement through the action of cam disc 44 and the pawl and ratchet wheel operated thereby, and the bracket 38 supporting the blank spindle is raised by means of lever 101. A new blank is then substituted, bracket 38 is lowered to operating position and clamped, and the actuating mechanism is again thrown into operation by manually disengaging pin 81 from the portion 85ª of lever 84 which reengages the clutch parts 92—93.

The construction thus far explained is adapted for the cutting of bevel gears, and as the latter have tooth spaces tapering outwardly from the center to the periphery of the blank, provision is made for imparting to the blank and cutter simultaneously with the rotation of the latter, shifting movement transversely of the plane of rotation of the cutter. In the present embodiment, the cutter is shifted by the cams 125—126 so as to move above and below a plane parallel with itself and passing substantially through the axis of the blank carrier about which as an axis the generating rolling movement occurs. The operation of these cams is so coordinated with the rotation of the cutter and the spacing of the tools of the latter that as a tool for cutting the upper side of a tooth space passes through the latter, the tool is progressively raised as it advances in rotation to develop the proper taper and as the succeeding tooth which cuts the lower side of the space is passing through the latter, the cutter is progressively lowered so that the lower side of the space also is tapered, the combined action of the alternate tools in this manner serving to finish both sides of the tooth space with the desired taper, while the generating action of the blank and tool produces the desired curvature of profile of the teeth. A tooth space is thus cut, or is finished if already roughed out, to the proper form on both sides at once by the continuously rotating cutter, and the blank is successively indexed until all of the teeth have been finished, requiring but one revolution of the blank.

Owing to the circular form of the cutter and the arc through which, as a consequence, the tools are moved, and since the latter have cutting sides oblique to the plane of rotation, each tool would ordinarily cut progressively wider as well as deeper as it approaches the position of a radius of the cutter normal to the pitch cone of the blank, and less wide and deep as the tool moves out of this position. In other words, the tooth spaces would be cut with a greater width at their longitudinal centers than at their ends. To compensate for this departure of the cutting portion of the tool from the true longitudinal form of the space desired, cams 123 and 124 have imposed upon the conformation thereof, explained above, for shifting the cutter to produce the taper of the tooth space, an additional compensating formation corresponding to each tool of the cutter, to move the latter downwardly while a tool is cutting the upper side of a space until the radius of the tool becomes perpendicular to the pitch cone of the gear and then upwardly as the tool moves from this position, and correspondingly to move the cutter, while a tool is cutting the lower surface of a space, first upwardly and then downwardly as the radius of the tool passes through a position normal to the pitch cone of the gear. This compensating movement of the cutter is illustrated in the diagrammatic figures 7 to 10. In Figure 7, 30 represents the tool in full lines in the position which it occupies while cutting at the extremities of the tooth space (disregarding the taper of the tooth) and in dotted lines in the position which it occupies while cutting at the longitudinal center of the tooth, being lower in the latter position than in the former. The dotted line C—D represents the side of the tooth space at its longitudinal center as it would be cut except for the compensating motion described, while line C—C represents the actual depth to which the interval is cut at its center by the circular movement of the tool, as shown also in Figure 9. The compensating movement does not correct for the arcuate shape of the bottom of the space, longitudinally of the latter, as this is unobjectionable. Figure 8 shows in face view the longitudinally true form of the space produced by reason of the compensation described. Figure 10 is a view similar to Figure 8 of the face of the space and shows generally the alternate arrangement of the tools for cutting the opposite sides of the latter.

While the operation described above is that for cutting a regular bevel gear with radial teeth, it is obvious that other forms of bevels could be generated by correspondingly varying the formation of the cams for shifting the cutter, or by adjusting the plane of the cutter to one side of the blank center as, for example, in cutting skew gears. It is also apparent that the relative shifting movement of the blank and cutter transversely of the cutter plane could be obtained by a movement of the blank instead of the cutter, as by rocking the blank about its axis.

The above described construction and mode of operation permits of the use of a single cutter disk for accurately cutting or generating at one time both sides of a tooth space, and this use of a single cutter permits making the latter sufficiently large in diameter to cooperate simultaneously with a plurality of gear blanks disposed about its periphery in the manner shown and described, thus much increasing the rate of output of the machine.

In Figures 11 and 12, there is shown a modification of the invention adapted for cutting spur gears, the general arrangement of the machine, and of the gears about the central cutter, being similar to that of the preferred embodiment. The blank is represented at 144 on a supporting spindle 145. The cutter is supported and rotated substantially as before, with a compensating shifting movement transversely of the plane of rotation, but since the tooth spaces are not tapered, the corresponding component of the shifting movement of the cutter is omitted.

The work spindle 145 is rotatably supported in a bearing 148 at the inner end of a frame 149 which is supported for a sliding movement toward and from the cutter on a bracket 150. The latter is supported for vertical movement in dovetailed guides 151, of a stationary support 152 fixed to the pedestal. Bracket 150 has fixed thereto a spindle 153 carrying a roller 154 cooperating with a cam slot 155 in the face of a disc 156 fixed at one end of the shaft 157 journaled in a stationary bearing 158. Shaft 157 has fixed at its other end a gear 159 meshing with gear 141 forming part of substantially the same train of actuating mechanism leading to the driving pulley 108 as in the preferred embodiment. It is apparent from this construction that as shaft 157 rotates, the cam slot 155 coacting with roller 154 reciprocates the bracket 150 vertically to produce the relative generating movement of the blank and cutter. Connected with the spindle 145 is a gear sector 160 meshing with a rack 161 carried by a stationary support 162 on the pedestal. These gear sectors serve to rotate the gear about its axis simultaneously with its vertical reciprocation to simulate the rolling of the pitch surface of the gear on the pitch surface of an imaginary rack of which the tools form a tooth, to generate the profiles of the teeth.

The indexing of the blank is accomplished by any suitable mechanism such, for instance, as that described in the said co-pending application and is indicated generally in the drawing by 163, this mechanism operating to index the blank through a pitch distance at the time that the latter is withdrawn from the tool.

The mechanism for withdrawing the blank for indexing comprises a roller 164ª coacting with a cam slot 164 of a cam disc 165 fixed on the upper end of a shaft 166, the latter carrying a gear 167 meshing with a gear 168 on a shaft 169 rotating in bearings 170 on the bracket 150. Shaft 169 has fixed thereto a gear 171 meshing with a gear 172 on a spindle 173 journaled in the end of a link 174 which is pivoted on shaft 169. Gear 172 meshes also with a gear 176 on shaft 157, an arm 175 being pivotally connected with spindle 173 and shaft 157, this arrangement forming a flexible driving mechanism for shaft 169 which permits of the vertical movement of the latter. In operation, the gear blank is given a rolling generating motion and subsequently withdrawn and indexed, the cutter rotating continuously to cut the tooth spaces and having the simultaneous transverse compensating motion previously described for producing the true longitudinal form of the space.

The present machine is intended to be used primarily for quantity production of gears of limited variation in dimensions, rather than as a machine of a universal type, and in cutting gears of different forms and dimensions, the operating parts are adjusted, or other parts substituted when necessary for suitably positioning, operating and cutting the blank.

The machine is simple in construction, comprising comparatively few parts of durable construction, and is rapid and accurate in operation.

I claim as my invention:

1. The combination of a gear blank carrier, a plurality of cutting tools, said carrier and tools having, relatively, a cutting movement and simultaneously therewith a shifting movement transversely of said cutting movement for bringing successive tools into cutting relation alternately with opposite sides of a tooth space in the blank, and means for effecting a relative rolling movement of said carrier and tools adapted to generate the profiles of the teeth.

2. The combination of a gear blank carrier, a tool head having a plurality of tools fixed thereon, said carrier and tools having, relatively, a cutting movement and simultaneously therewith a shifting movement transversely of said cutting movement to bring successive tools into cutting relation alternately with opposite sides of a tooth space in the blank, and means for effecting a relative rolling movement of said carrier and tools adapted to generate the profiles of the teeth.

3. The combination of a gear blank carrier, a plurality of tools, said carrier and tools having, relatively, a rotary cutting movement and simultaneously therewith a shifting movement transversely of the plane of rotation to bring successive tools to position for cutting, alternately, the opposite sides of a tooth space in the blank, and means for effecting a relative rolling movement of said carrier and tools adapted to generate the tooth profile.

4. The combination of a gear blank carrier, a plurality of tools, said tools and carrier having a relative rolling generating movement about an axis and also a relative rotary cutting movement in a plane parallel with said axis, and actuating means for simultaneously effecting a relative shifting movement of said carrier and tools transversely of said plane to bring successive tools alternately into cutting relation with opposite sides of a tooth space.

5. The combination of a gear blank carrier, a plurality of tools rotating about a common axis, means for effecting a relative rolling movement of said carrier and tools to generate the tooth profile, and actuating means for simultaneously effecting a relative shifting movement of said carrier and tools transversely of the plane of rotation of the latter to bring successive tools alternately into cutting relation with opposite sides of a tooth space.

6. The combination of a gear blank carrier, a rotary tool holder provided with a plurality of radially extending tools, means for effecting a relative rolling movement of said carrier and tools to generate the tooth profile, and actuating means for effecting simultaneously a relative shifting movement of said carrier and tool holder parallel with the axis of the latter to bring successive tools into cutting relation alternately with opposite sides of a tooth space.

7. The combination of a gear blank carrier, a tool, said carrier and tool having, relatively, a rolling movement about an axis to generate the tooth profile and also a rotary cutting movement in a plane parallel with said axis, and actuating means for effecting a relative shifting movement of said carrier and tool normally of said plane during said generating and cutting movements to cut a longitudinally tapered side of a tooth space.

8. The combination of a gear blank carrier, a rotating tool having a cutting portion inclined to its plane of rotation, said carrier and tool having simultaneously with the rotation of the tool a relative shifting movement transversely of said plane adapted to compensate for the variation of the path of said tool from the true longitudinal form of the tooth space, and means for effecting a relative rolling movement of said carrier and tool adapted to generate the tooth profile.

9. The combination of a gear blank carrier, a rotating tool having a cutting portion inclined to its plane of rotation, said carrier and tool having simultaneously with the rotation of the tool a relative shifting movement transversely of said plane comprising a component movement in one direction as the radial axis of said tool approaches a position normal to the pitch cone of the blank and in the opposite direction as said tool axis recedes from said normal position to compensate for the variation of the path of said tool from the true longitudinal form of the tooth space, and means for effecting a relative rolling movement of said carrier and tool adapted to generate the tooth profile.

10. The combination of a gear blank carrier, a plurality of tools having a rotary cutting movement about a common axis, said carrier and tools having simultaneously with said cutting movement a relative shifting movement substantially parallel with said axis to bring successive tools into cutting relation with the opposite sides, alternately, of a tooth space, and means for effecting a relative rolling movement of said carrier and tools adapted to generate the tooth profile.

11. The combination of a gear blank carrier, a plurality of tools having a rotary cutting movement about a common axis, actuating means for effecting simultaneously with said cutting movement a relative shifting movement of said tools and carrier transversely of said cutting movement to bring successive tools into cutting relation with opposite sides of a tooth space and to impart a longitudinal taper to the latter, and means for effecting a relative rolling movement of said tools and carrier to generate the tooth profile.

12. The combination of a gear blank carrier, a plurality of tools having a rotary cutting movement about a common axis with cutting portions of said tools inclined to the plane of rotation on each side thereof for cutting opposite sides of a tooth space, said carrier and tools having simultaneously with said cutting movement a relative shifting movement transversely of said plane to bring said tools into cutting relation with opposite sides of the tooth space and to compensate for the variation of the path of said cutting portions from the true longitudinal form of the tooth space, and means for effecting a relative rolling movement of said carrier and tools adapted to generate the tooth profile.

13. The combination of a gear blank carrier, a plurality of tools having a rotary movement about a common axis with cutting portions of said tools inclined to said axis, said carrier and tools having, simultaneously with said rotary movement, a relative shifting movement transversely of said plane adapted to cut a tapered side of said space and also to compensate for the variation of the path of said cutting portions of the tools from the true longitudinal form of said space, and means for effecting a relative rolling movement of said carrier and tools adapted to generate the tooth profile.

14. The combination of a gear blank carrier, a plurality of radially disposed tools having a rotary movement about a common axis with cutting portions of said tools inclined to the plane of rotation thereof, means for effecting a relative rolling movement of said carrier and tools for feeding the work to cut a complete tooth face and to generate the profile thereof, and actuating means for effecting a relative shifting movement of said carrier and tools transversely of said plane of rotation to compensate for the variation of the path of said tools from the true longitudinal form of the tooth face.

15. The combination of a gear carrier, a plurality of tools having a rotary movement about a common axis with cutting portions of said tools inclined to the plane of rotation on both sides thereof, said carrier and tools having simultaneously with said rotary movement a relative shifting movement transversely of said plane adapted to cut opposite tapered sides of said tooth space and also to compensate for the variation of the path of said cutting portions of the tools from the true longitudinal form of said space, and means for effecting a relative rolling movement of said carrier and tools adapted to generate the tooth profile.

16. The combination of a rotary tool holding disk provided with a plurality of radially extending tools having cutting portions inclined to the plane of rotation of said disk, a plurality of gear blank carriers supported in spaced relation about said disk for cooperation with said tools, means for imparting a relative rolling movement to said carriers and tools to feed the blanks and tools and generate the tooth profiles, said tool disk having a relative large diameter to accommodate said plurality of blanks and to cut teeth spaces with bottoms substantially straight longitudinally of the teeth, and actuating means for effecting a relative shifting movement of said carriers and disk transversely of the plane of rotation of the latter as each tool passes through a tooth space to impart longitudinal taper to the latter and to compensate for the variation of the path of movement of said inclined portions of the tools from the true longitudinal shape of the tooth face.

17. The combination of a rotary tool disk provided with a plurality of radially extending tools having cutting portions inclined to the plane of rotation thereof to represent a tooth of an imaginary gear, a carrier having a blank spindle disposed with its axis intersecting the axis of the carrier substantially at the center of said imaginary gear, means for relatively moving said carrier and tools to effect a relative rolling movement of the blank and imaginary gear tooth on their pitch surfaces to feed the work and generate the tooth profiles, and actuating means for effecting a relative shifting movement of said carrier and tools transversely of the plane of rotation of the latter to bring the tools into cutting relation with the tooth faces and impart a longitudinal taper to the latter.

18. The combination of a rotary tool holder provided with a plurality of tools adapted to sweep out a space representing a tooth of an imaginary gear, a blank carrier, means for relatively moving the carrier and tool holder to effect a rolling movement between the pitch surfaces of the blank and the imaginary gear represented by said tools to generate the tooth profiles, and actuating means comprising a cam for effecting a relative shifting movement of said carrier and tool holder transversely of the plane of rotation of the latter as each tool passes through a tooth space to produce a tapered shape of the latter.

19. The combination of a rotary tool holder provided with a plurality of radially extending tools having cutting portions inclined to the plane of rotation and adapted to sweep out a space representing a tooth of an imaginary gear, a blank carrier, means for relatively moving said carrier and tool holder to effect a rolling movement between the pitch surfaces of the blanks and the imaginary gear represented by said tools to generate the tooth profiles, and actuating means for effecting additional relative movement of said carrier and tools comprising a component movement in opposite directions transversely of the plane of rotation of the latter as each tool passes through a tooth space to compensate for the variation of the path of the tool from the true longitudinal shape of said space.

20. The method of cutting teeth in a gear blank consisting in simultaneously rotating a plurality of tools across the blank, shifting the tools and blank relatively to each other transversely of said rotary movement to bring successive tools into cutting relation with opposite sides, alternately, of a tooth space, and rolling the tools and blank relatively to each other to generate the tooth profile.

21. The method of cutting gear teeth consisting in simultaneously rotating a tool across the face of a blank, shifting the tool and blank relatively to each other parallel with the axis of rotation of the tool to impart a tapered shape to the tooth, and rolling the tool and blank relatively to each other to generate the tooth profile.

22. The method of cutting gear teeth consisting in rotating a tool across the face of a blank, with a cutting portion of the tool inclined to the plane of rotation of the latter to produce the desired pressure angle of the tooth, shifting the tool and blank relatively to each other transversely of said plane to compensate for the deflection of the path of the tool from the true longitudinal form of the tooth space, and rolling the tool and blank relatively to each other to generate the tooth profile.

23. The method of cutting teeth in a gear blank consisting in simultaneously rotating a plurality of tools across the blank, relatively shifting the tools and blank, alternately in opposite directions transversely of said rotary movement as successive ones of said tools cross the blank, and rolling the tools and blank relatively to each other to generate the tooth profile.

24. The method of cutting teeth in a gear blank consisting in simultaneously rotating a plurality of tools across the blank, effecting a plurality of relative shifting movements of said tools and blank in opposite directions transversely of said rotary movement during each rotation of the tools to bring different ones of the latter into cutting relation with opposite sides of the tooth space and to impart a longitudinally tapered shape to the latter, and relatively rolling the tools and blank to generate the tooth profile.

25. The method of cutting teeth in a gear blank consisting in simultaneously rotating a plurality of tools, about a common axis and across the face of the blank, effecting the feeding of the tools and blank by a relative rolling movement thereof adapted also to generate the tooth profile, and relatively shifting the blank and tools transversely of the rotary movement of the latter to bring successive ones of said tools into cutting relation with opposite sides, alternately, of a tooth space and to impart a longitudinally tapered shape to the latter.

26. The method of cutting gear teeth consisting in simultaneously rotating a tool across the face of a blank, effecting the feeding of the blank and tool by a relative rolling movement thereof adapted also to generate the tooth profile, and shifting the blank and tool transversely of the plane of rotation of the latter to impart a longitudinally tapered shape to the tooth and to compensate for departure of the path of movement of the tool from the true shape of the tooth face.

27. The combination of a gear blank carrier, a rotary tool holder having a plurality of tools arranged for cutting some on one side and some on the opposite side, exclusively, of a tooth space, means for effecting a relative rolling movement of said carrier and holder to generate the teeth profiles, and mechanism for shifting said holder transversely of its plane of rotation to bring successive tools into cutting engagement with corresponding sides of a tooth space.

28. The combination of a gear blank carrier, a rotary tool holder having a plurality of cutting tools, means for effecting a relative rolling movement between the carrier and tools to generate the teeth profiles, and mechanism for effecting a relative shifting movement between said carrier and tools transversely of the plane of rotation of the latter during the passage of each tool through the blank for shaping the tooth space longitudinally.

29. The combination of a gear blank carrier, a rotary tool holder having a plurality of tools successive ones of which are arranged to cut, exclusively, on opposite sides, alternately, of a tooth space, means for effecting a relative rolling movement between said carrier and tools to generate the teeth profiles, and mechanism for effecting relative shifting movements between said carrier and tools in opposite directions transversely of the plane of rotation of the latter to control the cutting action of successive tools on corresponding sides of a tooth space.

30. The combination of a gear blank carrier, a tool holder provided with a plurality of tools and supported for rotary cutting movement about an axis having a fixed direction, means for effecting a rolling movement of said carrier relative to said tools to generate the teeth profiles, and mechanism for effecting a relative shifting movement of said carrier and tools transversely of the plane of rotation of the latter to bring successive ones of said tools into cutting cooperation alternately with the opposite sides of a tooth space.

JAMES E. GLEASON.